US012600078B2

(12) United States Patent
Matsen et al.

(10) Patent No.: US 12,600,078 B2
(45) Date of Patent: Apr. 14, 2026

(54) INDUCTIVELY HEATED TOOLS FOR STAMP-FORMING THERMOPLASTIC COMPOSITES

(71) Applicant: The Boeing Company, Arlington, VA (US)

(72) Inventors: Marc R Matsen, Seattle, WA (US); Randall D. Wilkerson, St. Charles County, MO (US); Gwendolyn M. Janda, Seattle, WA (US)

(73) Assignee: The Boeing Company, Arlington, VA (US)

( * ) Notice: Subject to any disclaimer, the term of this patent is extended or adjusted under 35 U.S.C. 154(b) by 233 days.

(21) Appl. No.: 18/474,073

(22) Filed: Sep. 25, 2023

(65) Prior Publication Data

US 2025/0100205 A1    Mar. 27, 2025

(51) Int. Cl.
*B29C 51/42* (2006.01)
*H05B 6/10* (2006.01)

(52) U.S. Cl.
CPC ........... *B29C 51/428* (2013.01); *H05B 6/105* (2013.01)

(58) Field of Classification Search
CPC ........ B29C 33/06; B29C 51/428; H05B 6/105
See application file for complete search history.

(56) References Cited

U.S. PATENT DOCUMENTS

| | | | |
|---|---|---|---|
| 6,528,771 B1 | 3/2003 | Matsen et al. | |
| 10,425,997 B2 | 9/2019 | Matsen et al. | |
| 2016/0257034 A1 | 9/2016 | Chen et al. | |
| 2019/0191497 A1* | 6/2019 | Matsen ................. | H05B 6/104 |
| 2020/0084841 A1* | 3/2020 | Voss ....................... | H05B 6/105 |
| 2020/0170080 A1* | 5/2020 | Voss ........................ | H05B 6/44 |
| 2022/0379526 A1 | 12/2022 | Looks et al. | |

FOREIGN PATENT DOCUMENTS

EP          3915750 A1     1/2021

OTHER PUBLICATIONS

European Patent Office, Extended European Search Report in related application EP24201120, Feb. 14, 2025.

* cited by examiner

*Primary Examiner* — Yunju Kim
(74) *Attorney, Agent, or Firm* — Kolitch Romano Dascenzo Gates LLP

(57) ABSTRACT

A tool for stamp-forming thermoplastic components may include a frame reinforced by an infill material. The infill material (e.g., cast ceramic) is configured to provide compression resistance to the frame and to insulate the frame from heat. A forming plate is coupled to the frame, and the plate has a front face defining a forming surface of the tool. One or more inductive heating elements are configured to heat the plate, wherein each of the one or more inductive heating elements comprises a conductor (e.g., Litz wire) coupled to a susceptor material (e.g., Invar®), and the one or more inductive heating elements are configured to be self-regulating with respect to temperature.

18 Claims, 4 Drawing Sheets

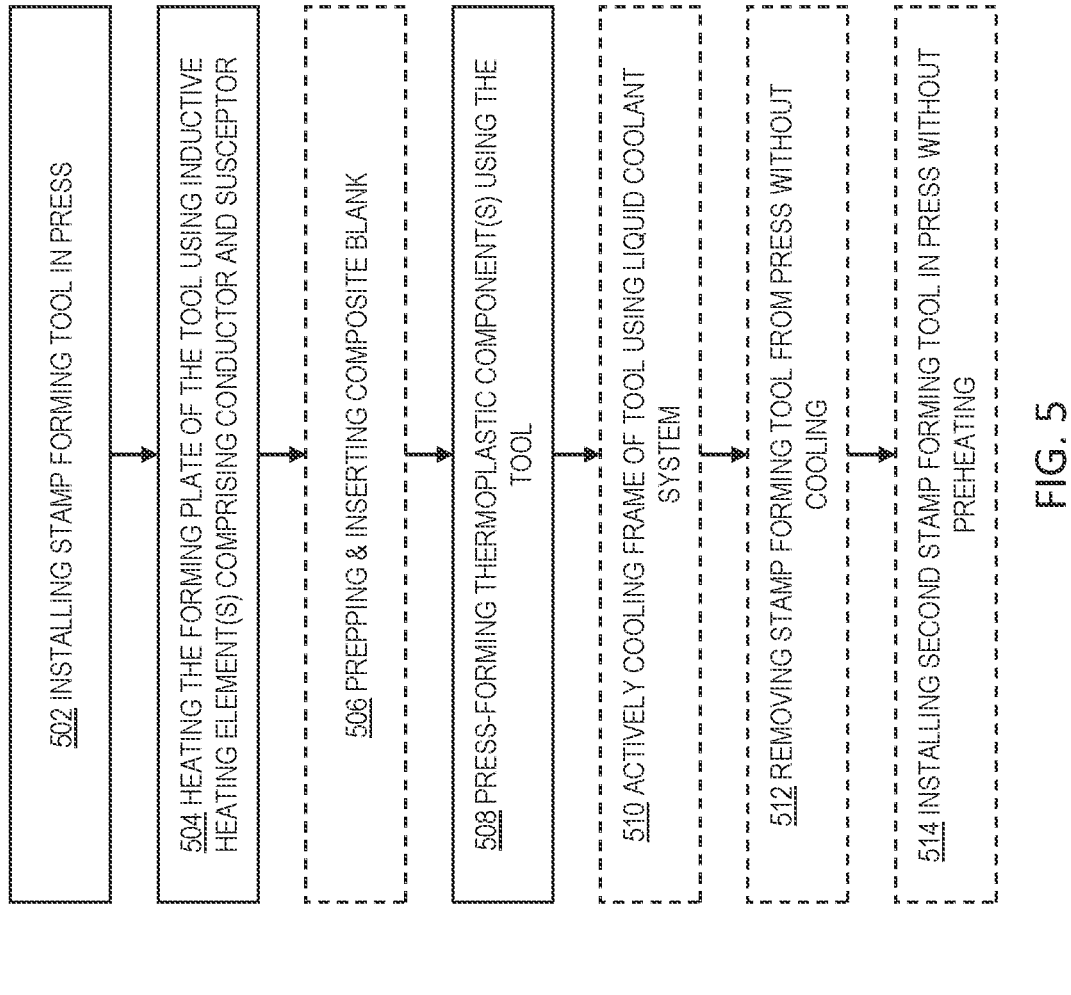

502 INSTALLING STAMP FORMING TOOL IN PRESS

504 HEATING THE FORMING PLATE OF THE TOOL USING INDUCTIVE HEATING ELEMENT(S) COMPRISING CONDUCTOR AND SUSCEPTOR

506 PREPPING & INSERTING COMPOSITE BLANK

508 PRESS-FORMING THERMOPLASTIC COMPONENT(S) USING THE TOOL

510 ACTIVELY COOLING FRAME OF TOOL USING LIQUID COOLANT SYSTEM

512 REMOVING STAMP FORMING TOOL FROM PRESS WITHOUT COOLING

514 INSTALLING SECOND STAMP FORMING TOOL IN PRESS WITHOUT PREHEATING

700 AIRCRAFT

702 AIRFRAME

706 INTERIOR

704 SYSTEMS

708 PROPULSION

710 ELECTRICAL

712 HYDRAULIC

714 ENVIRONMENTAL

600

602 SPECIFICATION & DESIGN

604 MATERIAL PROCUREMENT

606 COMPONENT & SUBASSEMBLY MANUFACTURING

608 SYSTEM INTEGRATION

610 CERTIFICATION & DELIVERY

612 IN SERVICE

614 MAINTENANCE & SERVICING

INDUCTIVELY HEATED TOOLS FOR STAMP-FORMING THERMOPLASTIC COMPOSITES

FIELD

The present disclosure relates to apparatuses and methods for stamp-forming thermoplastic composites using heated tooling.

BACKGROUND

Stamping tools used in the forming of thermoplastic components are heated for use in the forming process. This heating is provided by standard resistive-heating methods, wherein the entire tool is heated. Due to their typically large scale and correspondingly large thermal mass, thermoplastic stamp-forming tools take a long time to heat up to operating temperature. They are therefore often preheated before installation, for example to reduce the amount of down time for a given press or other forming apparatus. It is usually desirable to reduce down time, due to the high cost of the press and the corresponding need to keep its utilization high. However, preheating stamp-forming tools requires additional equipment and takes up valuable floor space in the manufacturing facility. Moreover, the installation of preheated tools in the press can also present safety and practicality concerns. Furthermore, heated stamp-forming tools also take a long time to cool down after use, adding further safety and practicality concerns.

SUMMARY

A potential advantage can be gained from the rapid heating of stamp-forming tools, such as through inductive heating, in simplifying the process and adding efficiencies for high rates of production. The present disclosure provides systems, apparatuses, and methods relating to a self-regulating inductive heating system for heated stamp-forming tools.

In some examples, a tool for stamp-forming thermoplastic components includes: a frame reinforced by an infill material configured to provide compression resistance to the frame and to insulate the frame from heat; a plate coupled to the frame, wherein the plate has a front face defining a forming surface of the tool; and one or more inductive heating elements configured to heat the plate, wherein each of the one or more inductive heating elements comprises a conductor coupled to a susceptor material, such that the one or more inductive heating elements are configured to be self-regulating with respect to temperature.

In some examples, a stamp-forming press includes: one or more stamp-forming tools installed in the press, each of the stamp-forming tools including: a heated forming tool includes: a structural frame having one or more cavities; a metal plate coupled to the structural frame, wherein the metal plate has a front face defining a forming surface of the forming tool; one or more inductive heating elements configured to heat the metal plate, each of the one or more inductive heating elements comprising a conductor coupled to a susceptor material; and an infill material disposed in the one or more cavities of the structural frame, wherein the infill material is configured to resist compression and to insulate the structural frame from heat.

In some examples, a method of stamp-forming thermoplastic components includes: installing a stamp-forming tool in a stamp-forming press without preheating the stamp-forming tool, the stamp-forming tool comprising one or more inductive heating elements configured to heat a forming surface of the stamp-forming tool, wherein each of the one or more inductive heating elements comprises a conductor coupled to a susceptor material; heating the forming surface of the stamp-forming tool by applying electrical power to the one or more inductive heating elements, such that the forming surface reaches and maintains an operating temperature determined at least in part by a Curie temperature of the susceptor material; and press-forming a thermoplastic component using the stamp-forming tool.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 5 is a block diagram depicting steps of an illustrative method for stamp-forming composite components in accordance with aspects of the present disclosure.

DETAILED DESCRIPTION

Figure 1:
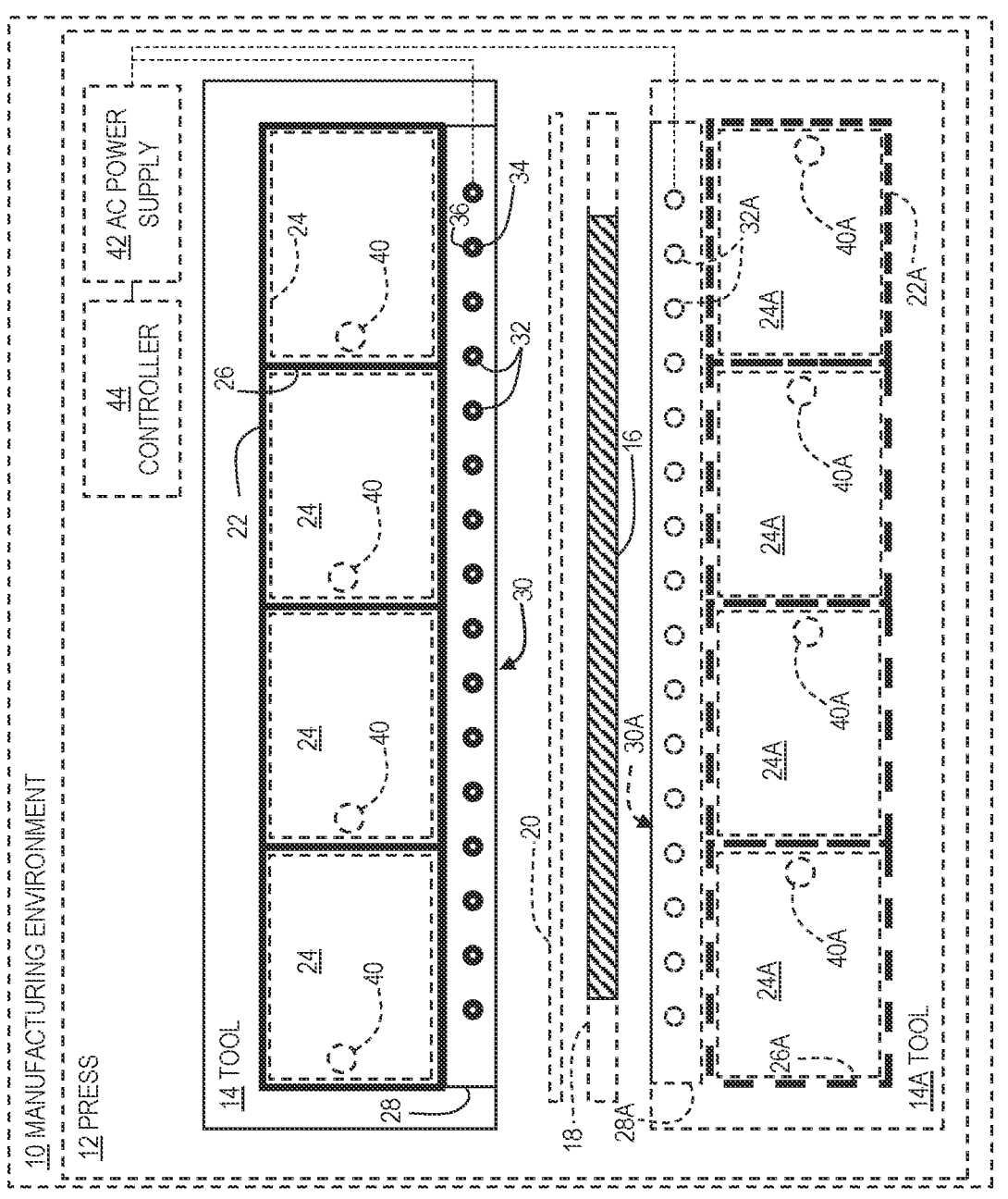
FIG. 1 is a schematic diagram of an illustrative stamp-forming press that includes one or more inductively heated tools in accordance with aspects of the present disclosure.

Various aspects and examples of inductively heated tools for stamp-forming thermoplastic composite components, as well as related methods, are described below and illustrated in the associated drawings. Unless otherwise specified, a system or apparatus in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

In general, systems of the present disclosure include one or more heated forming tools, each of the tools having a structural frame defining one or more cavities. A metal plate is coupled to the structural frame, defining a forming surface of the forming tool. One or more inductive heating elements are configured to heat the metal plate, and each of the inductive heating elements includes a conductor and a susceptor material. For example, a copper conductor may be coated with, coaxial with, wrapped in, wound with, coupled to, and/or intertwined with a susceptor material. In some examples, one or more Litz wires are wound with an Invar® 36 or Invar® 42 susceptor material (or other suitable chemistries) and embedded in or placed adjacent to the metal forming plate, forming a self-regulating heating element configured to heat only the forming plate. In some examples, Litz wire wound with smart susceptor wire may be further sheathed (wrapped, wound, etc.) with copper to prevent interaction with the metallic tool facing structure. To provide compression resistance and to insulate the structural frame from heat, a solid infill (e.g., a cast ceramic) is disposed in the cavities of the structural frame.

A forming or stamping press may utilize at least one of the heated forming tools. For example, a press may include a set of two of the heated forming tools in a complementary arrangement. The tool set is positioned in the press, and the press forces the two heated tools together to form and maintain full consolidation of the thermoplastic component.

The standard process of stamp-forming thermoplastic composites typically uses large, heated tools where the entire tool is heated (and preheated before installation). This method requires a large amount of energy, poses potential safety issues with the changing of tools, and requires expanded factory space to preheat and stage the tools. Systems and methods of the present disclosure address these issues by using self-regulating induction heaters to heat only a forming plate portion of the tool, while insulating and (in some cases) actively cooling the remainder of the tool.

In some examples of the present disclosure, Litz wires are wound with Invar® 36 smart susceptor wire to create self-regulating heating elements. These heating elements may be installed relative to the heating surface in a manner that provides suitable heat to the tooling surface. In general, closer proximity to the heating surface results in more efficient heating. Accordingly, the heating elements may be disposed against, in direct contact with, or proximate to a back side of the tooling surface (e.g., the metal plate mentioned above). In some examples, the heating elements are disposed partially or wholly within grooves or channels in the back side of the tooling surface. Disposing the heating elements in grooves or channels of the back side of the tooling surface may facilitate isolating the heat energy produced by the heating elements to the surface itself, reducing the transfer of heat energy to the remainder of the tool. Cast ceramic may be used to fill in the back of the (e.g., eggcrate) tooling, (1) to keep the induced heat isolated to the face of the tooling and (2) to resist deformation of the tool face during the stamp-forming process. Water cooling channels may be included to further maintain the temperature of the eggcrate reinforcement members of the tool that are located away from the tooling surface.

Systems of the present disclosure take advantage of the rapid heating and self-regulation of an induction heating circuit including a smart susceptor. In general, alternating current (AC) is passed through a conductor, generating a magnetic field. A susceptor material is located adjacent to the conductor.

Generally speaking, a susceptor is a material that converts electromagnetic energy to thermal energy. Susceptors may or may not be ferromagnetic, depending on the application. For example, copper may be used as a susceptor material in some instances. However, so-called smart susceptors are ferromagnetic and therefore have high relative magnetic permeability. Smart susceptors are magnetically permeable until they reach a certain temperature (known as the material's Curie temperature) above which the material becomes non-magnetic. Susceptors of the present disclosure may include any suitable metal, alloy, or other material that is electrically conductive and has a Curie temperature in a range desired for operation of the forming tool. For example, a susceptor may comprise at least one of iron, cobalt, nickel, molybdenum, and/or chromium. For example, the susceptor material Kovar is a nickel-cobalt ferrous alloy, and the susceptor material Invar® is a nickel-iron alloy.

The susceptor material runs along a length of the conductor and heats up due to induction from the magnetic field caused by the AC current in the nearby conductor. However, the temperature of the susceptor does not rise above the Curie temperature (in practice leveling off at a lower temperature). As the susceptor heats, the thermal profile of the susceptor asymptotically approaches a leveling temperature where the susceptor maintains thermal equilibrium. The leveling temperature is typically a few degrees below the susceptor's Curie temperature (e.g., within 2° F., or within 10° F., or within 50° F., or within 100° F.). If the susceptor begins to cool, its magnetic permeability increases and the heating process begins again. Accordingly, susceptor materials may be selected to achieve a desired operating temperature without needing elaborate temperature controls. Because of these self-regulating features, these susceptor materials are sometimes referred to as "smart" susceptors.

Litz wire is a conductor designed to be efficient for high-frequency applications (e.g., for induction), having a reduced skin effect and a reduced proximity effect. Litz wire includes a plurality of thin strands twisted or braided together. Each strand has a small enough diameter that current is distributed evenly across the strand. Each strand is also insulated from the others to reduce the proximity effect.

In some examples, Litz wires of the present disclosure are shielded by wrapping or encapsulating the smart susceptor-wrapped Litz wire further with a highly conductive material (e.g., copper or aluminum foil, tubing, and/or wire) configured to inhibit direct induction heating of the metallic tool plate in which the heating elements are embedded. U.S. patent application Ser. No. 18/307,478, filed on 26 Apr. 2023 includes suitable examples of such shielded Litz wires, and is hereby incorporated by reference in its entirety.

FIG. 1 is a schematic representation of a manufacturing environment 10 for stamp-forming thermoplastic composites (e.g., components comprising carbon fiber) using one or more heated tools. For example, manufacturing environment 10 may include any suitable environment in which illustrative embodiments of the present disclosure may be implemented, e.g., to manufacture one or more portions of an aircraft.

Accordingly, environment 10 includes a stamping press 12 configured to operate at least one heated forming tool 14 to shape a workpiece comprising a thermoplastic component 16. FIG. 1 depicts an illustrative second forming tool 14A, having the same components and optional components as tool 14. When press 12 includes both forming tool 14 and 14A, the heated forming tools may be arranged in a complementary manner to cooperatively form the workpiece. In general, forming of the workpiece may include holding the thermoplastic component in a jig or picture frame 18 and covering one or both sides of component 16 in an elastomeric sheet 20 configured to provide even pressure to the workpiece during stamp-forming.

Tool 14 (and 14A when present) may include a structural frame 22 reinforced by an infill material 24 configured to insulate frame 22 from heat (e.g., heat generated at a face of the tool). Structural frame 22 has one or more cavities 26 that are filled by compression-resistant infill 24. In some examples, structural frame 22 includes a plurality of spaced-apart (e.g., metal) frame members, and may constitute an eggcrate style frame. Infill material 24 may include any suitable material configured to have a thermal conductivity lower than frame 22 and to provide compression resistance at expected operating pressure ranges (e.g., 500 to 750 pounds per square inch (psi)). For example, infill 24 may comprise a cast material, e.g., a cast ceramic.

A plate 28 (e.g., a metal plate) is coupled to frame 22 and plate 28 has a front face 30 defining a forming surface of the tool. Plate 28 may comprise any suitable expanse of material configured to be heated and to press the workpiece into a desired configuration at the operating pressure and temperature. For example, the plate may comprise a metal, e.g., steel. In some examples, plate 28 comprises a nickel-iron alloy such as Invar® 36, which provides a low thermal expansion coefficient, reducing forces between the cooler substructure and the heated forming surface. Some or all of cavities 26 may extend to plate 28, and infill material 24 disposed in the cavities may be configured to oppose deformation of the metal plate during operation. Plate 28 may have a uniform or constant thickness across its expanse (e.g., across the width and/or length of the plate). In some examples, plate 28 has a thickness that varies by location, i.e., having a variable thickness. In some examples, plate 28 has a maximum thickness of approximately one inch. For example, the thickness of plate 28 may be 0.50 inches to 0.75 inches. In some examples, the forming surface of plate 28 is planar. In some examples, the forming surface has a non-planar profile and/or a three-dimensional contour-see, for example, the curvilinear profile 202 of plate 200 in FIG. 2.

One or more inductive heating elements 32 are configured to heat plate 28. Each one of inductive heating elements 32 comprises a conductor 34 coupled to a susceptor material 36. Conductor 34 may include any suitable conductive material, e.g., copper. In some examples, conductor 34 includes one or more Litz wires. Susceptor material 36 may include any suitable susceptor running along a length of the conductor, and may take any suitable form, such as a wire, a coating, a strand, a sheath, a container, etc. In some examples, susceptor material 36 comprises a nickel-iron alloy (e.g., Invar®, e.g., Invar® 36) or an iron-nickel-cobalt alloy. In some examples, the susceptor is wound (e.g., braided, twisted, plaited, etc.) together with the conductor. In some examples, the susceptor is coated onto the conductor and/or configured as a sheath for the conductor.

Figures 2, 3, 4:
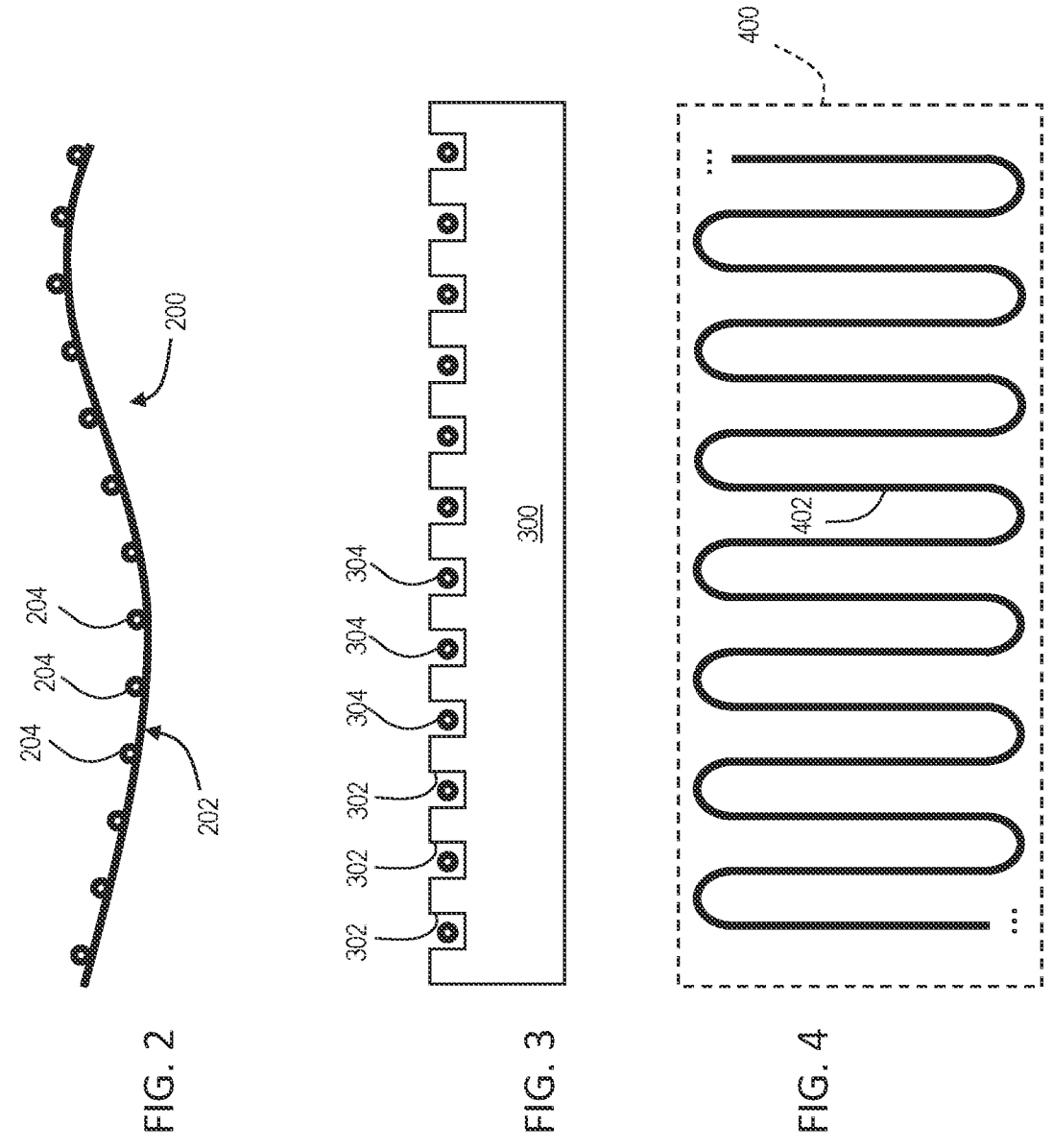
FIG. 2 is a schematic sectional side view of a portion of an illustrative stamp-forming tool of the present disclosure.
FIG. 3 is a schematic sectional side view of a portion of another illustrative stamp-forming tool of the present disclosure.
FIG. 4 is a schematic top view of a portion of yet another illustrative stamp-forming tool of the present disclosure.

Heating element(s) 32 may be disposed in any suitable location configured to heat plate 28 to operating temperature (e.g., to heat an entirety of plate 28). In some examples, the one or more inductive heating elements are coupled to a rear surface of plate 28 (i.e., a surface of the plate facing away from the forming surface). For example, heating element(s) 32 may be disposed on the rear surface of the plate, as depicted in the example of FIG. 2 where one or more heating elements 204 are disposed on plate 200. In some examples, heating element(s) 32 may be at least partially embedded in the plate, e.g., the heating element(s) may be disposed in one or more channels or grooves as depicted in the example of FIG. 3, where a plate 300 has a plurality of channels or grooves 302 on a back side of the plate, and one or more heating elements 304 are disposed in the grooves.

Heating element(s) 32 may be arranged on or adjacent to plate 28 in any suitable manner. For example, a single heating element may extend across all or a portion of the plate. In some examples, one of the heating elements is disposed on a rear surface of the plate in a serpentine or sinusoidal pattern. See heating element 402 on plate 400 of FIG. 4. Different heating elements may be utilized in different portions or zones of the plate, e.g., if more than one temperature is desired. In some examples, multiple heating elements may be installed side by side to provide further heating and/or redundancy. In some cases, different numbers of heating elements may be powered to provide further control of the heating.

In some examples, press 12 further includes a cooling system 40 configured to cool structural frame 22 of tool 14. Inductive heating element(s) are self-regulating and configured and/or positioned to heat only plate 28 directly. However, radiant and/or conductive heating of structural frame 22 may occur. To reduce this undesired heating, insulating infill material 24 is utilized, and one or more cooling lines or channels may be configured to remove heat from the structural frame. For example, the one or more cooling channels may be configured to transport a liquid coolant, e.g., water. A cooling circuit, e.g., an isolated cooling circuit, may be provided for the unheated portion of the tool. Coolant such as water or a water-glycol mixture is circulated through cooling ducts, channels, and/or tubes running through the infill 24 and/or adjacent structural frame 22. In examples where tubing is utilized, the tubing may comprise any suitable thermally conductive material configured to transfer heat between the tool and the coolant, such as stainless steel or copper. Ducts and/or channels may be formed directly in the infill material and/or the structural framing material. The coolant is pressurized and caused to flow by a cooling pump, and is configured to absorb heat while passing through the tool. The heated coolant then flows to a heat exchanger (e.g., a radiator) where the heat is dissipated to another medium (e.g., ambient air). Whether or not they pass through the infill material, the ducts, channels, and/or tubes of the coolant system may be designed to follow contours of the structural frame so as to better control the cooling effect of those framing members. A dedicated portion of the cooling system (e.g., the pump and heat exchanger) may be located adjacent the press, such that one or more tools can be hooked up sequentially or simultaneously and cooled accordingly (e.g., using flexible coolant lines attaching to fittings on the tool). In some examples, the pump and/or heat exchanger may be disposed on the tooling, such that the coolant system is self-contained.

Inductive heating of the susceptor is caused by an AC current being passed through the conductor of the inductive heating element(s). For this purpose, tool 14, press 12, and/or manufacturing environment 10 may include one or more power supplies 42, which are electrically coupled to the inductive heating elements to provide the AC current. A controller 44 may be included to control operation of the system, e.g., by controlling when the power supply is turned on and off.

As mentioned above, stamp-forming tool 14A may include any or all of the components as described with respect to tool 14. Accordingly, FIG. 1 depicts a structural frame 22A, an infill material 24A, cavities 26A, a plate 28A having a front face 30A, inductive heating elements 32A, and a cooling system 40A.

FIG. 5 schematically provides a flowchart that represents illustrative, non-exclusive steps of a method 500 for stamp-forming thermoplastic composite components according to the present disclosure. In FIG. 5, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 5 are not limiting and other methods and steps are within the scope of the present disclosure, including methods having greater than or fewer than the number of steps illustrated, as understood from the discussions herein. Aspects of the devices and systems described above may be utilized in the method steps described below. Where appropriate, reference may be made to components and systems that may be used in carrying out each step. These references are for illustration and are not intended to limit the possible ways of carrying out any particular step of the method.

Step 502 of method 500 includes installing a stamp-forming tool in a stamp-forming press. In some examples, this is done without first preheating the tool, in contrast to standard methods. The stamp-forming tool may include any or all aspects described with respect to tool 14 above. In some examples, the stamp-forming tool includes a frame reinforced by a compression-resistant infill material configured to insulate the frame from heat and a plate coupled to the frame. The plate has a front face defining a forming surface of the tool. One or more inductive heating elements are configured to heat the plate, and each of the one or more inductive heating elements comprises a conductor (e.g., a Litz wire) coupled to a susceptor material (e.g., a nickel-iron alloy such as Invar® 36).

Step 504 of method 500 includes resisting undesired heating and compression of the tool using an infill material having a thermal conductivity lower than the thermal conductivity of the frame. For example, a solid infill material may provide a rigid reinforcement while also insulating the frame of the tool from heat. Unlike traditional systems, method 500 involves heating only the forming plate of the tool (see step 506). In other words, the method includes refraining from actively heating the remainder (e.g., the frame) of the stamp-forming tool.

The frame of the stamp-forming tool may include a plurality of metal frame members coupled to the plate and defining one or more cavities. For example, the frame may be an eggcrate style frame. The plate may comprise a metal (e.g., steel), may have a uniform or varying thickness, and may be thin relative to an overall dimension of the tool, e.g., having a maximum thickness of one inch. In some examples, the forming surface of the plate has a non-planar and/or three-dimensional profile.

The infill material is disposed in the one or more cavities of the tooling, is resistant to compression to reinforce the tool and prevent deformation of the plate, and has a thermal conductivity lower than the frame to provide heat insulation. In some examples, the infill material comprises a cast material (e.g., a ceramic).

In some examples, step 506 of method 500 includes preparing a composite material blank for a forming operation by the stamp-forming press. For example, the blank may be preheated in an (e.g., infrared) oven or similar device to facilitate forming. The blank may be placed on, loaded in, and/or coupled to a frame configured to facilitate handling of the blank without damaging or unnecessarily contacting the composite material, referred to as a picture frame. In some cases, the blank is clamped to the picture frame.

Step 508 of method 500 includes heating the plate of the stamp-forming tool (e.g., directly) by applying electrical power to the one or more inductive heating elements, such that the forming surface of the plate reaches and maintains an operating temperature determined at least in part by a Curie temperature of the susceptor material. In some examples, heating the plate to reach the operating temperature takes less than half an hour. In some examples, the operating temperature is a levelling off temperature less than the Curie temperature.

In some examples, the heating element(s) are configured to directly heat only the plate. For example, the one or more inductive heating elements may be coupled to (e.g., at least partially embedded in) a rear surface of the plate. For example, the inductive heating element(s) may be disposed in one or more channels or grooves on a back side of the plate.

Step 510 of method 500 includes press-forming a thermoplastic component using the stamp-forming tool. In some examples, the thermoplastic component comprises a composite material (e.g., carbon fiber). As mentioned in step 506, the thermoplastic component may be placed into the stamp-forming press as a composite material blank, e.g., on a picture frame.

In some examples, press-forming the thermoplastic component using the stamp-forming tool includes pressing the thermoplastic material against an underlying surface (i.e., between two forming surfaces). In some examples, the underlying surface is a second tool having a complementary forming surface. In some examples, one tool may be referred to as a "male" tool and the other tool as a "female" tool.

In some examples, step 510 of method 500 includes actively cooling the frame using a liquid coolant system. Actively cooling the frame may include transferring or absorbing heat from the frame into a flowing coolant. The coolant system may include any suitable coolant, such as water, and may include one or more channels, pipes, or other pathways configured to flow the coolant near the members of the frame to remove heat. In some examples, the liquid coolant system may be an integral part of the tooling and/or of the press.

In some examples, step 512 of method 500 includes removing the stamp-forming tool from the press. This step may include disconnecting the stamp-forming tool from an electrical power supply. Step 514 of method 500 includes installing a second stamp-forming tool into the press to replace the first stamp-forming tool.

Step 512 may further include removing the tool from the press without waiting for the tool to cool down, and step 514 may include installing the second stamp-forming tool in the stamp-forming press without preheating the tool. The inductive heating methods of the present disclosure enable faster changeover times, as relatively rapid heating can be performed with the tool in the press. As compared with traditional methods, a much smaller percentage of the mass of the tool is heated, and therefore heat-up and cool-down times are reduced. Moreover, since the bulk of the tool is unheated, it can be more easily and safely handled, either immediately or very quickly after the pressing operation is completed. Accordingly, step 512 may be performed without waiting for the previously in-use tool to cool down and/or without waiting for the replacement tool to heat up. In other words, the previous tool may be removed hot and the replacement tool may be installed cold, e.g., without increasing the overall changeover time as compared with traditional systems.

Figure 7:
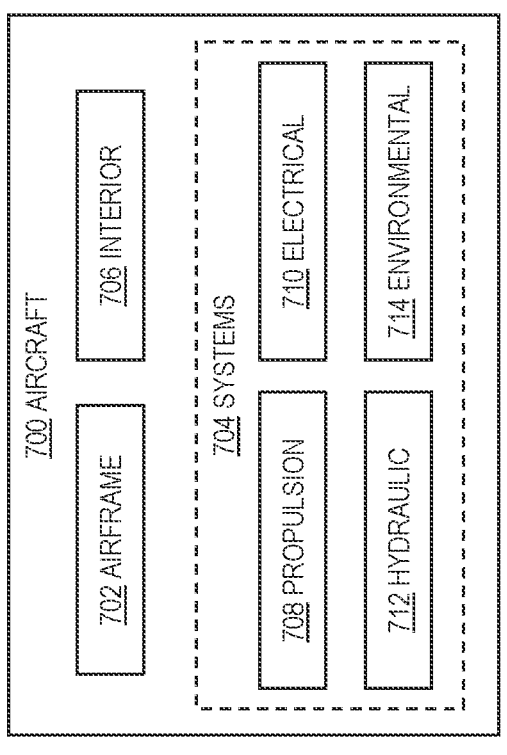
FIG. 7 is a block diagram of an illustrative aircraft in which an illustrative embodiment may be implemented.
Figure 6:
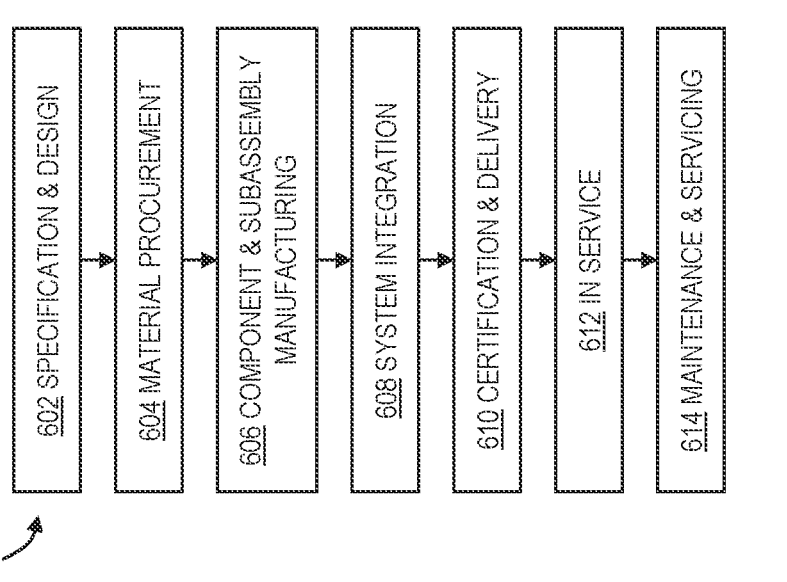
FIG. 6 is a block diagram of an illustrative aircraft manufacturing and service method in accordance with the present teachings.

Illustrative embodiments of the present disclosure may be described in the context of an aircraft manufacturing and service method 600 as shown in FIG. 6 and an aircraft 700 as shown in FIG. 7. Turning first to FIG. 6, an illustration of an aircraft manufacturing and service method is depicted in accordance with an illustrative embodiment.

During preproduction, aircraft manufacturing and service method 600 may include specification and design 602 of aircraft 700 and material procurement 604. During production, component and subassembly manufacturing 606 and system integration 608 of aircraft 700 takes place. Thereafter, aircraft 700 may go through certification and delivery 610 in order to be placed in service 612. While in service 612 by a customer, aircraft 700 is scheduled for routine maintenance and service 614, which may include modification, reconfiguration, refurbishment, or other maintenance and service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft is depicted in which an illustrative embodiment may be implemented. In this example, aircraft 700 is produced by aircraft manufacturing and service method 600 of FIG. 6 and may include airframe 702 with plurality of systems 704 and interior 706. Examples of systems 704 include one or more of propulsion system 708, electrical system 710, hydraulic system 712, and environmental system 714. Any number of other systems may be included.

Apparatuses and methods embodied herein may be employed during at least one of the stages of aircraft manufacturing and service method 600. One or more illustrative embodiments may be manufactured or used during at least one of component and subassembly manufacturing 606, system integration 608, in service 612, or maintenance and service 614 of FIG. 6.

A portion of airframe 702 of aircraft 700 can be formed by method 500 and method 500 can be performed during component and subassembly manufacturing 606. Press 12 can be used to form a composite structure during component and subassembly manufacturing 606. In some illustrative examples, a composite structure formed using method 500 is present and utilized during in service 612. Method 500 can be performed during maintenance and service 614 to form a replacement part.

Illustrative, non-exclusive examples of inventive subject matter according to the present disclosure are described in the following enumerated paragraphs:

A1. A tool for stamp-forming thermoplastic components, the tool comprising:
a frame reinforced by an infill material configured to insulate the frame from heat;
a plate coupled to the frame, wherein the plate has a front face defining a forming surface of the tool; and one or more inductive heating elements configured to heat the plate, wherein each of the one or more inductive heating elements comprises a conductor coupled to a susceptor material.

A2. The tool of A1, wherein the frame comprises a plurality of metal frame members.

A3. The tool of A1 or A2, wherein the infill material has a thermal conductivity lower than the frame.

A4. The tool of any one of paragraphs A1 through A3, wherein the infill material comprises a cast material.

A5. The tool of any one of paragraphs A1 through A4, wherein the infill material comprises a ceramic.

A6. The tool of any one of paragraphs A1 through A5, wherein the infill material is configured to provide compression resistance.

A7. The tool of any one of paragraphs A1 through A6, wherein the frame is an eggcrate style frame.

A8. The tool of any one of paragraphs A1 through A7, wherein the plate comprises a metal.

A9. The tool of any one of paragraphs A1 through A7, wherein the plate comprises steel or a nickel-iron alloy (e.g., Invar 36).

A10. The tool of any one of paragraphs A1 through A9, wherein the plate has a variable thickness.

A11. The tool of any one of paragraphs A1 through A10, wherein the plate has a maximum thickness of one inch.

A12. The tool of any one of paragraphs A1 through A11, wherein the forming surface has a non-planar profile.

A13. The tool of any one of paragraphs A1 through A12, wherein the conductor is a Litz wire.

A14. The tool of any one of paragraphs A1 through A13, wherein the susceptor material is a nickel-iron alloy.

A15. The tool of any one of paragraphs A1 through A14, wherein the susceptor is wound together with the conductor.

A16. The tool of any one of paragraphs A1 through A15, wherein the susceptor is coated onto the conductor.

A17. The tool of any one of paragraphs A1 through A16, wherein the susceptor runs a length of the conductor.

A18. The tool of any one of paragraphs A1 through A17, wherein the one or more inductive heating elements are coupled to a rear surface of the plate.

A19. The tool of any one of paragraphs A1 through A18, wherein the one or more inductive heating elements are at least partially embedded in the plate, e.g., disposed in channels or grooves.

A20. The tool of any one of paragraphs A1 through A19, further comprising a cooling system configured to cool the frame of the tool.

A21. The tool of A20, wherein the cooling system comprises ducts, channels, and/or tubing disposed at least partly adjacent the frame of the tool.

A22. The tool of A21, wherein one or more of the ducts, channels, and/or tubes passes through the infill material.

A23. The tool of A20, wherein the cooling system comprises stainless steel tubing disposed adjacent the frame of the tool, the tubing configured to contain a liquid coolant.

A24. The tool of A20, wherein the cooling system is configured to be coupled to a coolant pump configured to pressurize a coolant and a heat exchanger configured to remove heat from the coolant.

A25. The tool of A24, wherein the coolant pump and/or the heat exchanger are disposed on the tool.

A26. The tool of any one of paragraphs A1 through A25, further comprising one or more power supplies coupled to the one or more inductive heating elements.

A27. The tool of any one of paragraphs A1 through A26, wherein the one or more inductive heating elements are configured to heat only the plate.

A28. The tool of any one of paragraphs A1 through A27, wherein the one or more inductive heating elements are self-regulating with respect to temperature.

A29. The tool of any one of paragraphs A1 through A28, wherein the one or more inductive heating elements are configured to heat only the plate, and wherein the tool includes no further heating elements.

A30. A stamping press comprising the tool of any one of paragraphs A1 through A29.

A31. The stamping press of A30, further comprising a second one of the tools of any one of paragraphs A1 through A29, wherein the plate of the second one of the tools has a complementary shape with respect to the plate of the first one of the tools.

B1. A heated forming tool, comprising:

a structural frame having one or more cavities;

a metal plate coupled to the structural frame, wherein the metal plate has a front face defining a forming surface of the forming tool;

one or more inductive heating elements configured to heat the metal plate, each of the one or more inductive heating elements comprising a conductor coupled to a susceptor material; and an infill material disposed in the one or more cavities of the structural frame, wherein the infill material is configured to resist compression and to insulate the structural frame from heat.

B2. The heated forming tool of B1, wherein the metal plate comprises steel.

B3. The heated forming tool of B1 or B2, wherein the one or more inductive heating elements are configured to heat an entirety of the metal plate.

B4. The heated forming tool of any one of paragraphs B1 through B3, wherein the one or more inductive heating elements are coupled to the metal plate.

B5. The heated forming tool of B4, wherein the one or more inductive heating elements are coupled to a rear surface of the metal plate.

B6. The heated forming tool of B4, wherein the one or more inductive heating elements are each at least partially disposed in a groove (e.g., a respective groove) of a rear surface of the metal plate.

B7. The heated forming tool of B4, wherein the one or more inductive heating elements are at least partially embedded in the metal plate.

B8. The heated forming tool of any one of paragraphs B1 through B7, wherein the conductor comprises a Litz wire.

B9. The heated forming tool of any one of paragraphs B1 through B8, wherein the susceptor material comprises a nickel-iron alloy.

B10. The heated forming tool of any one of paragraphs B1 through B9, further comprising a cooling system configured to cool the structural frame.

B11. The heated forming tool of B10, wherein the cooling system comprises one or more cooling channels.

B12. The heated forming tool of B11, wherein the one or more cooling channels are configured to transport a liquid coolant.

B13. The heated forming tool of B12, wherein the liquid coolant comprises water.

B14. The heated forming tool of any one of paragraphs B1 through B13, wherein the forming surface has a three-dimensional contour.

B15. The heated forming tool of any one of paragraphs B1 through B14, wherein the structural frame comprises a plurality of spaced apart frame members.

B16. The heated forming tool of any one of paragraphs B1 through B15, wherein the structural frame comprises an eggcrate frame.

B17. The heated forming tool of any one of paragraphs B1 through B16, wherein the metal plate has a uniform thickness.

B18. The heated forming tool of B17, wherein the uniform thickness is less than or equal to one inch.

B19. The heated forming tool of any one of paragraphs B1 through B18, wherein the metal plate has a maximum thickness of one inch.

B20. The heated forming tool of any one of paragraphs B1 through B19, wherein the infill material is further configured to oppose deformation of the metal plate during operation.

B21. The heated forming tool of any one of paragraphs B1 through B20, wherein the supportive infill is a solid material.

B22. The heated forming tool of any one of paragraphs B1 through B21, wherein the supportive infill comprises a ceramic material.

B23. The heated forming tool of any one of paragraphs B1 through B22, wherein the supportive infill comprises a ceramic cast into the one or more cavities.

B24. The heated forming tool of any one of paragraphs B1 through B23, wherein the supportive infill comprises a material having a lower thermal conductivity than the structural frame.

B25. The heated forming tool of any one of paragraphs B1 through B24, wherein each of the one or more cavities extend to a rear surface of the metal plate.

B26. The heated forming tool of any one of paragraphs B1 through B25, further comprising one or more power supplies coupled to the one or more inductive heating elements.

B27. The heated forming tool of any one of paragraphs B1 through B26, further comprising an electronic controller configured to selectively control electrical power to the one or more inductive heating elements.

B28. A stamping press comprising at least one heated forming tool of any one of paragraphs B1 through B27.

B29. The stamping press of B28, wherein the press comprises two of the heated forming tools in a complementary arrangement.

C1. A method of for stamp-forming thermoplastic components, the method comprising:

installing a stamp-forming tool in a stamp-forming press, the stamp-forming tool comprising a frame reinforced by an infill material configured to resist compression and to insulate the frame from heat, a plate coupled to the frame wherein the plate has a front face defining a forming surface of the tool, and one or more inductive heating elements configured to heat the plate, wherein each of the one or more inductive heating elements comprises a conductor coupled to a susceptor material;

heating the plate of the stamp-forming tool by applying electrical power to the one or more inductive heating elements, such that the forming surface of the plate reaches and maintains an operating temperature determined at least in part by a Curie temperature of the susceptor material; and press-forming a thermoplastic component using the stamp-forming tool.

C2. The method of C1, further comprising actively cooling the frame.

C3. The method of C2, wherein actively cooling the frame includes using a liquid coolant system.

C4. The method of any one of paragraphs C1 through C3, wherein the thermoplastic component comprises a composite material.

C5. The method of C4, wherein the composite material comprises carbon fiber.

C6. The method of any one of paragraphs C1 through C5, wherein heating the plate to reach the operating temperature takes less than half an hour.

C7. The method of any one of paragraphs C1 through C6, wherein the frame comprises a plurality of metal frame members.

C8. The method of any one of paragraphs C1 through C7, wherein the frame defines one or more cavities and the infill material is disposed in the one or more cavities.

C9. The method of any one of paragraphs C1 through C8, wherein the infill material has a thermal conductivity lower than the frame.

C10. The method of any one of paragraphs C1 through C9, wherein the infill material comprises a cast material.

C11. The method of any one of paragraphs C1 through C10, wherein the infill material comprises a ceramic.

C12. The method of any one of paragraphs C1 through C11, wherein the frame is an eggcrate style frame.

C13. The method of any one of paragraphs C1 through C12, wherein the plate comprises a metal.

C14. The method of any one of paragraphs C1 through C13, wherein the plate comprises steel.

C15. The method of any one of paragraphs C1 through C13, wherein the plate comprises an iron-nickel alloy.

C16. The method of any one of paragraphs C1 through C15, wherein the plate has a variable thickness.

C17. The method of any one of paragraphs C1 through C16, wherein the plate has a maximum thickness of one inch.

C18. The method of any one of paragraphs C1 through C17, wherein the forming surface has a non-planar profile.

C19. The method of any one of paragraphs C1 through C18, wherein the conductor is a Litz wire.

C20. The method of any one of paragraphs C1 through C19, wherein the susceptor material is a nickel-iron alloy or a nickel-iron-cobalt alloy.

C21. The method of any one of paragraphs C1 through C20, wherein the one or more inductive heating elements are coupled to a rear surface of the plate.

C22. The method of any one of paragraphs C1 through C21, wherein the one or more inductive heating elements are at least partially embedded in the plate.

C23. The method of any one of paragraphs C1 through C22, wherein the one or more inductive heating elements are configured to directly heat only the plate.

C24. The method of any one of paragraphs C1 through C22, wherein press-forming the thermoplastic component using the stamp-forming tool comprises pressing the thermoplastic component against an underlying surface.

C25. The method of C24, wherein the underlying surface comprises a second one of the stamp-forming tools.

C26. The method of any one of paragraphs C1 through C25, further comprising removing the stamp-forming tool from the press.

C27. The method of C26, wherein removing the tool comprises disconnecting the one or more inductive heating elements from an electrical power supply.

C28. The method of C26 or C27, wherein removing the tool from the press includes removing the tool from the press without waiting for the tool to cool down.

C29. The method of any one of paragraphs C1 through C28, wherein installing the stamp-forming tool in the stamp-forming press includes installing the tool without preheating the tool.

D0. A stamp-forming press, comprising:

one or more stamp-forming tools installed in the press, each of the stamp-forming tools including:

a structural frame having one or more cavities;

a metal plate coupled to the structural frame, wherein the metal plate has a front face defining a forming surface of the forming tool;

one or more inductive heating elements configured to heat the metal plate, each of the one or more inductive heating elements comprising a conductor coupled to a susceptor material; and an infill material disposed in the one or more cavities of the structural frame, wherein the infill material is configured to resist compression and to insulate the structural frame from heat.

D1. The stamp-forming press of D0, wherein the metal plate comprises steel.

D2. The stamp-forming press of D0 or D1, wherein the one or more inductive heating elements are coupled to the metal plate and configured to directly heat only the metal plate.

D3. The stamp-forming press of D2, wherein the one or more inductive heating elements are each at least partially disposed in a respective groove in a rear surface of the metal plate.

D4. The stamp-forming press of any one of D0 through D3, wherein the conductor comprises a Litz wire.

D5. The stamp-forming press of any one of D0 through D4, further comprising a cooling system configured to actively cool the structural frame.

D6. The stamp-forming press of any one of D0 through D5, wherein the one or more stamp-forming tools include a first stamp-forming tool and an opposing second stamp-forming tool, wherein a contour of the forming surface of the first stamp-forming tool is complementary to a contour of the forming surface of the second stamp-forming tool.

E0. A method for stamp-forming thermoplastic components, the method comprising:

installing a stamp-forming tool in a stamp-forming press without preheating the stamp-forming tool, the stamp-forming tool comprising one or more inductive heating elements configured to heat a forming surface of the stamp-forming tool, wherein each of the one or more inductive heating elements comprises a conductor coupled to a susceptor material;

heating the forming surface of the stamp-forming tool by applying electrical power to the one or more inductive heating elements, such that the forming surface reaches and maintains an operating temperature determined at least in part by a Curie temperature of the susceptor material; and press-forming a thermoplastic component using the stamp-forming tool.

E1. The method of E0, wherein the stamp-forming tool further comprises a frame reinforced by an infill material configured to resist compression and to insulate the frame from heat, the method further comprising actively cooling the frame.

E2. The method of E0 or E1, wherein actively cooling the frame comprises absorbing heat from the frame into a flowing coolant.

E3. The method of any one of E0 through E2, further comprising refraining from actively heating a frame of the stamp-forming tool.

E4. The method of E3, wherein the conductor comprises a Litz wire.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device. "Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A tool for stamp-forming thermoplastic components, the tool comprising:
   an eggcrate-style structural frame having spaced apart frame members defining a plurality of cavities, wherein the eggcrate-style structural frame is reinforced by an infill material disposed in the plurality of cavities of the eggcrate-style structural frame, and wherein the infill material is configured to provide compression resistance to the eggcrate-style structural frame and to insulate the eggcrate-style structural frame from heat;
   a plate coupled to the eggcrate-style structural frame, wherein the plate has a front face defining a forming surface of the tool; and
   one or more inductive heating elements configured to heat the plate, wherein each of the one or more inductive heating elements comprises a conductor physically coupled to a susceptor material, such that the one or more inductive heating elements are configured to be self-regulating with respect to temperature;
   wherein the one or more inductive heating elements are at least partially embedded in a rear face of the plate.

2. The tool of claim 1, wherein the infill material has a thermal conductivity lower than the eggcrate-style structural frame.

3. The tool of claim 1, wherein the infill material comprises a cast ceramic.

4. The tool of claim 1, wherein the one or more inductive heating elements are configured to heat only the plate, and wherein the tool includes no further heating elements.

5. The tool of claim 1, wherein the conductor is a Litz wire.

6. The tool of claim 1, wherein the susceptor material is a nickel-iron alloy or an iron-nickel-cobalt alloy.

7. The tool of claim 1, wherein the one or more inductive heating elements are disposed in one or more grooves formed in the rear face of the plate.

8. A stamp-forming press, comprising:
   one or more stamp-forming tools installed in the stamp-forming press, each of the stamp-forming tools including:
   an eggcrate-style structural frame having spaced apart frame members defining a plurality of cavities;
   a metal plate coupled to the eggcrate-style structural frame, wherein the metal plate has a front face defining a forming surface of the stamp-forming tool;
   one or more inductive heating elements configured to heat the metal plate, each of the one or more inductive heating elements comprising a conductor physically coupled to a susceptor material; and an infill material disposed in the plurality of cavities of the eggcrate-style structural frame, wherein the infill material is configured to resist compression and to insulate the eggcrate-style structural frame from heat.

9. The stamp-forming press of claim 8, wherein the metal plate comprises steel.

10. The stamp-forming press of claim 8, wherein the one or more inductive heating elements are coupled to the metal plate and configured to directly heat only the metal plate.

11. The stamp-forming press of claim 10, wherein the one or more inductive heating elements are each at least partially disposed in a respective groove in a rear surface of the metal plate.

12. The stamp-forming press of claim 8, wherein the conductor comprises a Litz wire.

13. The stamp-forming press of claim 8, further comprising a cooling system configured to actively cool the eggcrate-style structural frame.

14. The stamp-forming press of claim 8, wherein the one or more stamp-forming tools include a first stamp-forming tool and an opposing second stamp-forming tool, wherein a contour of the forming surface of the first stamp-forming tool is complementary to a contour of the forming surface of the second stamp-forming tool.

15. A heated forming tool, comprising:

an eggcrate-style structural frame having spaced apart frame members defining a plurality of cavities;

a metal plate coupled to the eggcrate-style structural frame, wherein the metal plate has a front face defining a forming surface of the forming tool;

one or more inductive heating elements physically coupled to the metal plate and configured to heat the metal plate, each of the one or more inductive heating elements comprising a conductor physically coupled to a susceptor material; and an infill material disposed in the plurality of cavities of the eggcrate-style structural frame, wherein the infill material is configured to resist compression and to insulate the eggcrate-style structural frame from heat.

16. The heated forming tool of claim 15, wherein the infill material comprises a cast ceramic.

17. The heated forming tool of claim 15, wherein the conductor is a Litz wire and the susceptor material is a nickel-iron alloy or an iron-nickel-cobalt alloy.

18. The heated forming tool of claim 15, wherein the one or more inductive heating elements are disposed in one or more grooves formed in a rear face of the plate.

* * * * *